United States Patent [19]

Raleigh et al.

[11] Patent Number: 4,859,529

[45] Date of Patent: Aug. 22, 1989

[54] FIBERS, FABRICS AND FLEXIBLE POROUS SUBSTRATES SIZED WITH A CURABLE HYDROPHILIC SILICONE POLYETHER POLYMER

[75] Inventors: William J. Raleigh, Rensselaer; James E. Doin, Hoosick Falls; Frank J. Traver, Troy, all of N.Y.

[73] Assignee: General Electric Co., Waterford, N.Y.

[21] Appl. No.: 185,643

[22] Filed: Jun. 20, 1988

Related U.S. Application Data

[62] Division of Ser. No. 24,187, Mar. 10, 1987, Pat. No. 4,758,646.

[51] Int. Cl.$^4$ .......................... C08G 77/06; D02G 3/00
[52] U.S. Cl. .................................... 428/290; 428/266; 428/304; 428/391; 428/447
[58] Field of Search ............... 428/375, 391, 447, 446, 428/304, 317, 320, 323, 289, 290, 260, 262, 266, 272; 524/462, 465, 588; 525/404, 407, 409; 528/15, 25, 29; 556/444

[56] References Cited

U.S. PATENT DOCUMENTS

| | | |
|---|---|---|
| 3,600,418 | 8/1971 | Bailey et al. |
| 4,184,004 | 1/1980 | Pines et al. .......................... 428/413 |
| 4,246,423 | 1/1981 | Martin ................................ 556/423 |
| 4,293,611 | 10/1981 | Martin ................................ 428/266 |
| 4,323,488 | 4/1982 | Takago et al. ...................... 556/444 |
| 4,463,115 | 7/1984 | Hirose et al. ...................... 524/270 |
| 4,467,105 | 8/1984 | Kotzsch et al. .................... 556/444 |
| 4,618,646 | 10/1986 | Takago et al. ......................... 528/5 |
| 4,618,656 | 10/1986 | Kawakubo et al. ................ 525/404 |
| 4,683,250 | 7/1987 | Mikami ................................ 522/33 |

Primary Examiner—Lorraine T. Kendell

[57] ABSTRACT

A bis (alkoxysilyl) polyether is produced and utilized as a fabric sizing agent.

3 Claims, No Drawings

FIBERS, FABRICS AND FLEXIBLE POROUS SUBSTRATES SIZED WITH A CURABLE HYDROPHILIC SILICONE POLYETHER POLYMER

This application is a division of application Ser. No. 024,187, filed 3/10/87, now U.S. Pat. No. 4,758,646.

The present invention relates to bis(alkoxysilyl)-polyether copolymers. More particularly, the present invention relates to such copolymers and their use as a fabric treatment.

BACKGROUND OF THE INVENTION

The use of silicones as textile finishing agents has grown rapidly because of the many desirable properties which they impart to fabrics such as durable water repellency, water borne-spot and stain resistance, luxurious hand and drape, improved sewability, increased flex abrasion resistance, increased tear strength, improved wrinkle recovery and others. Conventional silicones are non-reactive dimethylpolysiloxane products. However, to obtain maximum durability on the fabric, reactive or curable dimethylpolysiloxane polymers are now widely being used.

One major disadvantage of dimethylpolysiloxane polymers as finishing agents, whether reactive or non-reactive, is that the finish offers no benefit relative to antistat properties or water absorbency. Conventional dimethylpolysiloxane polymer finishes increase the hydrophobicity of a fabric.

It is an object of the present invention to provide a silicone finishing agent which provides fiber/fabric lubricity, (i.e. "hand") which is hydrophilic and which offers antistat properties not achievable with conventional silicone finishes.

It is a further object of the present invention to provide such a silicone finishing agent which is curable and not removed during laundering.

It is yet another object of the present invention to provide such a silicone finishing agent to improve soil/stain release properties on fibers or fabrics.

DETAILED DESCRIPTION OF THE INVENTION

Briefly, according to the present invention, there is provided a bis(alkoxysilyl)polyether copolymer having the formula:

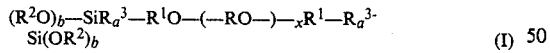   (I)

wherein R is a divalent substituted or unsubstituted hydrocarbon radical of from 2 to about 10 carbon atoms, $R^1$ is a divalent substituted or unsubstituted hydrocarbon radical of from 2 to about 25 carbon atoms, $R^2$ is a monovalent substituted or unsubstituted hydrocarbon radical of from 1 to about 6 carbon atoms, $R^3$ is selected from the group consisting of hydrogen and $R^2$, b is 2 or 3, the sum of a+b is 3, and x is from 2 to about 100.

Suitable R groups are divalent substituted or unsubstituted hydrocarbon radicals of from 2 to 10 carbon atoms and preferably from 2 to 6 carbon atoms. Such R groups include alkylene and substituted alkylene groups, for example, $—C_3H_6—$, $—(CH_3)CHCH_2CH_2—$, $—CH_2(CH_3)CHCH_2—$, $—CF_2CF_2—$, $—CH_2CH_2—$, etc; substituted and unsubstituted arylalkylene groups, for example, $—(C_6H_5)CHCH_2—$, $—[(C_6H_5)CH_2]CHCH_2—$, etc.; and substituted and unsubstituted arylene groups, for example, $—(C_6H_4)—$, $—(C_6H_2Cl_2)—$, etc. Preferred R groups are ethylene and propylene.

The value of X may broadly be from about 2 to about 100. Preferably, X should be from about 3 to about 30. The polyether portion insures water solubility of the copolymer and thus X must be at least sufficient to provide water solubility of the molecule. Otherwise, X should be controlled so as to provide a total molecular weight ranging from about 200 to about 10,000 g/g-m and preferably ranging from about 200 to about 5,000 g/g-m.

Of course, it is readily apparent that the polyether of formula 1 need not be a homopolymer. R can be randomly chosen from substituted or unsubstituted hydrocarbons or R can be chosen to form blocks of, for instance, polyethylene oxide with polypropylene oxide. Thus, R can form a copolymer, terpolymer, etc., including the block configurations thereof.

Suitable $R^1$ groups are divalent substituted and unsubstituted hydrocarbons having from 2 to about 25 carbon atoms. These $R^1$ groups include substituted and unsubstituted alkylene groups, for example, $—C_3H_6—$, $—CH_2(CH_2)_{10}CH_2—$, $—CH_2(CH_2)_9C(=O)—$, etc., substituted and unsubstituted arylene groups, for example $—(C_6H_4)—$, $—(C_6H_2Cl_2)$, etc. It is preferred herein that one of the $R^1$ groups is a substituted alkylene group which forms an ester linkage to the polyether moiety. Thus, for example, it is preferred that one $R^1$ be an unsubstituted alkylene such as propylene and the second $R^1$ be a derivative of an alpha-beta unsaturated carboxylic acid forming an ester linkage with the polyether, such as, 10-hendecenoic acid.

$R^2$ is a substituted or unsubstituted monovalent hydrocarbon radical having from 1 to about 8 carbon atoms. Included within the scope of $R^2$ is methyl, ethyl, propyl, t-butyl, phenyl, fluoropropyl, etc. Preferably, $R^2$ is methyl. $R^3$ is the same as $R^2$ but including hydrogen. b must be 2 or 3 and the sum of a+b is 3.

Compounds as shown in formula 1 may be produced in a variety of ways. The preferred method is to esterify an alpha-beta unsaturated polyether produced, for example, by polymerizing alkylene oxide in the presence of ally alcohol with an alpha-beta unsaturated organic acid and to subsequently perform an addition reaction between the terminal unsaturation and a SiH compound in the presence of a platinum catalyst. Both the esterification and addition reactions are well known to persons skilled in the art.

The above described bis(alkoxysilyl)polyethers may be applied to fabrics, fibers and flexible porous surfaces by spraying, dipping, etc. to provide their beneficial effects. Generally, they are dissolved in a solvent such as water, a halohydrocarbon, for example 1,1,1-trichloroethane, or an organic solvent, for example toluene, at from about 0.5 to about 25% by weight solids. The solution is applied to the fabric and cured to provide a product utilization of from about 0.1% to about 10% based on the weight of the fabric.

Cure may be effected quickly in the presence of moisture and at elevated temperatures, i.e. from about 150° to about 400° F., or cure may be allowed to progress slowly in the presence of atmospheric moisture and at room temperature. Preferably the compound is cured with heat. Room temperature cure may require catalysts such as an effective amount of tin soap including dibutyl tin diacteate and dibutyl tin dilaurate, which are relatively expensive.

EXAMPLES

The following examples are given by way of illustration and not by way of limitation. All parts are by weight.

EXAMPLE 1

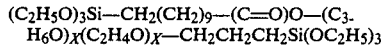

Esterification

To a 2 liter, 3 neck round bottom flask equipped with heating mantle, variable controller, stirrer, thermometer, reflux head, and condenser there was added 600 gm of 1800 g/g-m molecular weight mono-allyl alcohol terminated poly(alkylene oxide),

[50 mol % ethylene oxide, 50 mol % propylene oxide] and 200 gm of toluene (solvent). Since the polyether contains residual free base (NaOH), 1 gm 85% phosphoric acid was added to neutralize base and then the solution was refluxed to dry (remove water). Once the solution was dry, there were added 60 gm 10-hendecenoic acid followed by 2 gm of trifluoroacetic acid to initiate esterification. The conversion of the free —OH on the polyether and —COOH from the organic acid was monitored using I.R. scans noting a decrease in acid peak and increase in ester peak. The solution was kept at 135° C. and water generated by formation of the ester was trapped (azeotroped) out. When the acid peak was diminished, the trifluoroacetic acid was neutralized with sodium bicarbonate and the solution refluxed for about an hour to insure completion.

Olefin Addition

The reaction vessel containing the ester of 10-hendecenoic acid and the poly(alkylene oxide) were then cooled to 110° C. and an addition funnel was added to glassware assembly. About 25 gm of triethoxysilane was added to the reaction solution followed by 2 drops Lamoreaux Pt catalyst to initiate olefin addition. An exotherm was not observed. Then another 85 gm of triethoxysilane was added and 5 drops of additional Pt catalyst. An exotherm was observed, since the pot temperature rose from 110° C. to 118° C. After about one hour at 110° C., an I.R. scan was run that indicated no SiH present. Then the solvent was removed by stripping the reaction solution to 130° C. at 20 mm pressure. The resultant alkoxysilane polyether polymer was filtered through Celite #545 filter aid. A clear fluid with a yellow-brown cast was the final product.

EXAMPLE 2

Esterification

To a vessel equipped as in example 1 there was added 585 gm of 1400 g/g-m molecular weight mono-allyl alcohol terminated poly(alkylene oxide)

[65 mol % ethylene oxide, 35 mol % propylene oxide] and 200 gm toluene. The polyester had a pH of 7.3, therefore the free base was not neutralized with phosphoric acid. There were added 60 gm 10-hendecenoic acid and the esterification was catalyzed by the addition of about 2 gm of trifluoroacetic acid. The conditions were like example 1. Once esterification was complete, the catalyst (trifluoroacetic acid) was neutralized with sodium bicarbonate.

Olefin Addition

To the reaction vessel containing the ester of 10-hendecenoic acid and the poly(alkylene oxide) in toluene, there was added 133 gm triethoxysilane. Then 5 drops of Pt catalyst was added (vessel about 110° C.) and a slight exotherm noted (less than 5° C. rise). The solution was agitated and the temperature controlled at 110° C. for an additional hour. An I.R. scan was run and no SiH peak found. Therefore the solvent was removed by stripping to 140° C. at 50 mm in the presence of 50 gm of [[2-[-2-(methoxyethoxy)ethoxy]ethanol]]. the resultant fluid was filtered through Celite 545.

EXAMPLE 3

Our evaluation utilized gray 65/35 polyester/cotton sheeting. Specimens for testing were 10"×20". Two sets of fabric were finished with each sizing agent evaluated. Sizing agents tested included a dimethyl fluid emulsion (non reactive), a dimethyl fluid emulsion (reactive), and the bis(alkoxysilyl)polyether in example 2.

Finishing baths were prepared to contain 2% solids based on active silicone product. Typical finishing techniques were employed relative to padding and curing which was conducted at 300° F. for 5 minutes.

The solids pickup after padding and curing all fabric test specimens independent of product utilized was 0.7% by weight of dry fabric.

The finished test specimens (2 for each sizing agent tested) were broken down into 2 sets for testing stain removal. The sheets were stained with the following materials in the manner shown. The materials were applied with a spatula in a circular rubbing motion. Nearly equal quantities of each material was applied.

| 1 | 2 |
|---|---|
| 3 | 4 |
| 5 | 6 |

1. Ketchup
2. Mayonnaise
3. Grape Jelly
4. Pizza Sauce
5. Mustard
6. Coffee

A control set containing no silicone finish was also stained. The stained fabrics were allowed to dry overnight.

Wash #1

One set (Set #1) was then washed in home laundry machine using only cold water for both wash and rinse cycle. Fabrics were allowed to dry at ambient temperature.

The other set (Set #2) was washed in home laundry machine using warm water and detergent for wash cycle. Cold water rinse. Fabrics allowed to air dry.

Stain Removal Observation

Set #1

1. Ketchup and grape jelly removed from all test pieces.
2. Mayonnaise oil stain remains on all in apparently equal amounts.
3. Pizza sauce and mustard stain visible on all in equal quantities.

4. Trace coffee stain remains on bis(alkylsilyl)-polyether test specimen. Fabrics finished with both dimethyl fluid emulsions and Control (no finish) all have equal but more remaining.

Set #2

1. Fabric finished with bis(alkoxysilyl)polyether has substantially less of the oil stain remaining from mayonnaise versus the dimethyl fluid emulsions and Control test specimens.
2. Pizza and mustard remain on all in apparently equal quantities. However, the amounts are less than Set #1.
3. Ketchup, grape jelly and coffee removed from all.

Wash #2

A second washing was conducted with both Set #1 and Set #2. This washing consisted of using detergent and bleach with warm water for wash cycle. Cold water rinse. Fabric allowed to dry at ambient temperature.

Stain Removal Observation

Set #1

1. Slight trace of pizza sauce and mustard remain on all specimens; however, both bis(alkoxysilyl)polyether and non-reactive dimethyl fluid emulsion test pieces have slightly less visible than either the reactive dimethyl fluid emulsion or the control.
2. Mayonnaise oil stain remains on all however, less visible on bis(alkoxysilyl)polyether finished specimen. All other stains removed.

Set #2

1. Trace pizza sauce remains on the Control and both dimethyl fluid emulsion specimens. None was observed on the bis(alkoxysilyl)polyether test specimen.
2. Mayonnaise oil stain still quite evident on the Control and both dimethyl fluid emulsion test specimens. Stain was slightly visible on the bis(alkoxysilyl)polyether.
   Mayonnaise oil stains on Set #2 definitely less than Set #1 primarily due to previous washing cycles.
3. Mustard and all other stains removed.

The general observation from these experiments was that fabric treated with bis(alkoxysilyl)polyether definitely aided in removal of various materials utilized versus standard silicone finishes while still providing good "hand" to the fabric.

Fabric Wetting

Wetability was evaluated utilizing the following procedure. The test specimen was spread out on the flat desk top surface. One drop of water from a medicine dropper was placed on the test specimen. A timer was immediately started. The time necessary for the drop to completely wet and dissipate was measured. Drops were placed in several locations on each specimen to determine an average time.

|  | Seconds |
| --- | --- |
| Control Set (not washed) | |
| untreated fabric | 40–60 |
| non-reactive dimethyl fluid emulsion | 60–80 |
| reactive dimethyl fluid emulsion | 120–160 |
| bis (alkoxysilyl) polyether | 0 |
| Set #1 (after 2 washings)* | |
| untreated fabric | 0 |
| non-reactive dimethyl fluid emulsion | 60–80 |
| reactive dimethyl fluid emulsion | 120–160 |
| bis (alkoxysilyl) polyether | 0 |
| Set #2 (after 2 washings)** | |
| untreated fabric | 0 |
| non-reactive dimethyl fluid emulsion | 15–30 |
| reactive dimethyl fluid emulsion | 120–160 |
| bis (alkoxysilyl) polyether | 0 |

*The surface area of wetting was larger with bis (alkoxysilyl) polyether test specimens than the untreated control indicating enhanced wetting feature still functioning following 2 washings.
**Same observations relative to wetting as with Set #1 specimens. The reduced time to wet with non-reactive dimethyl fluid emulsion indicates product removal of silicone following washings.

The results of this simple test confirm that the wetability aids in stain removal of materials utilized in our tests.

EXAMPLE 4

Antistat Test

A very simple test was utilized to determine relative effectiveness of our invention to possibly provide antistat (prevent static charge build up) properties. The test was conducted on fabric finished with non-reactive and reactive dimethyl fluid emulsions and bis(alkoxysilyl)polyether. The fabrics were not washed.

The procedure utilized was as follows. The test specimen was spread on a desk top and brushed with a hair brush using 10 evenly paced strokes to build up a potential static charge. Following brushing the fabric was dipped vertically into a cigarette ash tray containing a good quantity of ground up ashes.

Both the non-reactive and reactive dimethyl fluid emulsion finished fabrics attracted numerous ashes to the bottom of fabric and up to height of 3 to 4 inches. The bis(alkoxysilyl)polyether test specimen had very slight attraction of ashes at the base. It was also observed that the slight charge built up on the latter test specimen dissipated rapidly with the ashes falling off rapidly. This was not the case with ether dimethyl fluid emulsion treated fabrics.

Thus in general the use of a reactive silicone polyether moiety offers significant advantage over conventional silicone textile finishes, most obvious being:
1. hydrophilic finish (wetability);
2. stain/soil release benefits, and
3. antistat properties.

What is claimed is:
1. A fiber, fabric or flexible porous substrate sized with a curable bis(alkoxysilyl)polyether of the general formula:

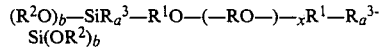

wherein R is a divalent substituted or unsubstituted hydrocarbon radical of from 2 to about 10 carbon atoms, $R^1$ is a divalent substituted or unsubstituted hydrocarbon radical of from 2 to about 20 carbon atoms, at least one R' is a substituted alkylene group which is a derivative of 10-hendecenoic acid and forms an ester linkage to the polyether moiety $R^2$ is a monovalent substituted or unsubstituted hydrocarbon radical of from 1 to about 6 carbon atoms, $R^3$ is selected from the group consisting of hydrogen and $R^2$, b is 2 or 3, the sum of a+b is 3, and x is from 1 to 100.
2. The fiber, fabric or flexible porous substrate of claim 1 wherein said curable polyether contains sufficient tin soap catalyst to promote cure.
3. The fiber, fabric or flexible porous substrate of claim 1 sized with from 0.1% to about 10% of its weight with said polyether.